United States Patent
Brandsma et al.

(10) Patent No.: US 8,118,707 B2
(45) Date of Patent: Feb. 21, 2012

(54) METHOD FOR CONTROLLING A BELT-TYPE CONTINUOUSLY VARIABLE TRANSMISSION AND A FRICTION CLUTCH IN A VEHICULAR DRIVE LINE

(75) Inventors: Arjen Brandsma, Tilburg (NL);
Antonius Adrianus Helena Maria Van Dongen, Gilze (NL); Wilhelmus Johannes Maria Van Wijk, Udenhout (NL)

(73) Assignee: Robert Bosch GmbH, Stuttgart (DE)

( * ) Notice: Subject to any disclaimer, the term of this patent is extended or adjusted under 35 U.S.C. 154(b) by 762 days.

(21) Appl. No.: 12/159,394

(22) PCT Filed: Dec. 28, 2005

(86) PCT No.: PCT/NL2005/000898
§ 371 (c)(1),
(2), (4) Date: Oct. 8, 2008

(87) PCT Pub. No.: WO2007/075080
PCT Pub. Date: Jul. 5, 2007

(65) Prior Publication Data
US 2009/0124455 A1 May 14, 2009

(51) Int. Cl.
*B60W 10/02* (2006.01)
*B60W 10/10* (2012.01)
(52) U.S. Cl. ............. 477/176; 477/39; 477/44; 477/180
(58) Field of Classification Search .................. None
See application file for complete search history.

(56) References Cited

U.S. PATENT DOCUMENTS

| | | | |
|---|---|---|---|
| 4,534,748 A | 8/1985 | Stieg et al. | |
| 4,606,446 A | 8/1986 | Watanabe et al. | |
| 4,860,863 A * | 8/1989 | Hayashi | 477/39 |
| 5,672,132 A * | 9/1997 | Schwab | 474/8 |
| 5,800,298 A * | 9/1998 | Kanehara et al. | 474/8 |
| 6,702,086 B2 * | 3/2004 | Ries-Mueller et al. | 192/103 F |
| 6,974,009 B2 | 12/2005 | Hoshiya et al. | |
| 7,022,043 B2 | 4/2006 | Luh | |
| 7,188,717 B2 * | 3/2007 | Hoshiya et al. | 192/3.63 |
| 2001/0023216 A1 * | 9/2001 | Bolz et al. | 477/44 |
| 2003/0069682 A1 * | 4/2003 | Iwatsuki et al. | 701/51 |

FOREIGN PATENT DOCUMENTS

| | | |
|---|---|---|
| DE | 103 04 436 A1 | 8/2003 |
| DE | 102 22 664 A1 | 12/2003 |
| EP | 0 446 497 A1 | 9/1991 |
| EP | 0 634 589 A2 | 1/1995 |
| EP | 0 798 492 A1 | 10/1997 |
| EP | 1 302 702 A2 | 4/2003 |
| JP | 1-46057 A | 2/1989 |
| JP | 1-234650 A | 9/1989 |
| JP | 2000-145898 A | 5/2000 |
| JP | 2000-193081 A | 7/2000 |

* cited by examiner

*Primary Examiner* — David D Le
*Assistant Examiner* — Jacob S Scott
(74) *Attorney, Agent, or Firm* — Young & Thompson

(57) ABSTRACT

The invention provides for a vehicle drive line provided with an engine (1) capable of generating an engine torque (Te), a continuously variable transmission (2), a driven wheel (5) and two friction clutches (3, 33), a first clutch (3) being positioned in the drive line between the engine (1) and the transmission (2) and a second clutch (33) being positioned between the transmission (2) and the driven wheel (5), wherein a torque (Tc-max) that is transmissible by the first clutch (3) and a torque (Tc-max) that is transmissible by the second clutch (33) are both less than a torque (Tt-max) transmissible by the transmission (2) and, at the same time, are both essentially equal to or slightly higher than the engine torque (Te).

3 Claims, 2 Drawing Sheets

METHOD FOR CONTROLLING A BELT-TYPE CONTINUOUSLY VARIABLE TRANSMISSION AND A FRICTION CLUTCH IN A VEHICULAR DRIVE LINE

The present invention relates to a method for controlling a belt-type continuously variable transmission and a friction clutch in a vehicular drive line. Such a control method is well known and, for instance, is described in U.S. Pat. No. 4,606,446 in relation with a transmission having two variable pulleys and a belt wrapped around and in frictional contact therewith. The invention also relates to a method for designing such a transmission.

A problem generally encountered in belt-type transmission is that slip between the friction components thereof, i.e. its belt and pulley components, needs to be avoided or at least may occur only to a limited extend, since excessive slip results in excessive wear and tear of these components. To prevent such slip, a sufficient normal force is to be applied between the pulleys and the belt, which normal force is often determined in dependence on the engine torque to be transmitted by the transmission increased by a safety margin. The safety margin is introduced because the engine torque is not always accurately known and, moreover, because sudden torque level variations, i.e. torque jolts, may also be introduced into the drive line both by the engine itself and via the driven wheel or wheels, e.g. when driving over a pothole in the road.

It has been a long-standing development aim to minimise the said safety margin, since the efficiency and durability of the transmission may be significantly improved thereby. A solution has been found in controlling the friction clutch in such a manner that the torque that is transmitted or transmissible thereby, which is denoted the clutch slip torque hereinafter, is less than the torque that is transmissible by the transmission, i.e. between the belt and each pulley thereof. This latter torque level is denoted the transmission slip torque hereinafter. According to U.S. Pat. No. 4,606,446 the clutch may thereby be positioned either upstream or downstream of the transmission with respect to the flow of power from the engine to the driven wheels of the vehicle.

Whenever a torque jolt occurs in such system, the clutch slip torque is exceeded before the transmission slip torque, whereby a slipping of the clutch increases and the mechanical energy represented by the torque jolt is at least partly dissipated into heat. Actually, the clutch slip torque will increase somewhat during the torque jolt because of the increased slipping of the clutch, but such increase is comparatively small and can normally be accommodated by the transmission that is controlled to have a slip torque that is higher than the initial clutch slip torque.

However, a problem does occur with the above system and control method, because in dependence on the upstream or downstream position of the clutch relative to the transmission, either the torque jolts introduced by the engine or by the driven wheel will first travel through the transmission before reaching the clutch. Then, the torque jolt will then at least be partly dissipated in the transmission, which is undesirable per se. Such problem could be obviated by again applying a comparatively high safety margin, which would of course completely nullify the original development aim.

In practice only a downstream position of the clutch is applied in combination with the known control method, because the torque jolts that are introduced into the drive line via the driven wheels are supposed to be less predictable and more severe than those originating from the engine. Still, from a transmission design, i.e. hardware layout, point of view an upstream clutch can be more easily and efficiently integrated in the transmission. Also, during operation, the clutch that is arranged upstream relative to the transmission is mechanically loaded far less when compared to the downstream clutch in terms of both the maximum torque and the maximum rotational speed to be transmitted thereby. Moreover, it is Applicant's experience that also the torque jolts originating from the engine, especially in case of a Diesel engine, can be of a magnitude that is detrimental to the transmission's efficiency, i.e. that require a considerable safety margin to be applied to the normal force, in particular at a relatively low nominal engine torque level.

The present invention aims to improve on the known design, in particular by improving the protection of the transmission against torque jolts whether originating from the engine or from the road. According to the invention this aim is realised by the drive line of claim 1. More in particular, the invention aims to also reconcile the above-mentioned engineering preference to position the clutch upstream, i.e. between the engine and the transmission, with such protection of the transmission against torque jolts. Such aim may according to the present invention even be realised in a drive line of known design by applying the control method of any one of the independent claims 2, 4 and 6.

In the drive line of claim 1 two clutches are provided, a first clutch is positioned upstream of the transmission and a second clutch is positioned downstream of the transmission. The clutches are arranged such in the drive line that the respective clutch slip torque levels thereof are both less than transmission slip torque and, at the same time, are essentially equal to or possibly somewhat higher the engine torque level. In such a drive line the transmission is effectively protected against all torque jolts, irrespective of whether they originate from the engine or the driven wheel. Consequently, the said safety margin can be favourably small. It is remarked that some existing drive line designs already include two clutches, such as the lock-up or bridging clutch of a torque converter or a drive-off clutch and the clutch of a planetary or DNR-gearing, which accordingly merely have to be arranged and possibly made suitable for clutch slip torque control.

However, according to the invention, even when the drive line is provided with only a single clutch suitable and arranged for clutch slip torque control, it is possible to improve the protection of the transmission against torque jolts by applying the control method of claim 2.

It is understood that when such clutch is arranged on the "other" side of the transmission in relation to the origin of a torque jolt, a slipping of the belt relative to a pulley in the direction of rotation thereof will unavoidably occur due to a torque jolt that exceeds the said safety margin. Still, Applicant has observed that the belt is capable of accommodating a considerable amount of slip relative to the transmission pulleys without being damaged at all. Experiments have shown that during transmission operation such capacity to accommodate belt slip up to a critical slip value varies at least with the level of the said normal force, the rotational speed of the belt and with the geometric transmission ratio. For each transmission ratio and belt rotational speed such relationship between the critical slip value and the normal force level is described by—and is hereinafter referred to as—a critical damage curve. It was found that in terms of the smallest allowable slip value at a given level of the normal force, the most decelerating transmission ratio, the so-called Low-ratio, in combination with a small belt rotational speed represents the most critical situation. In contrast, in the most accelerating transmission ratio, the so-called Overdrive-ratio, in combination with a large belt rotational speed a large amount of belt slip can be accommodated by the transmission.

In a so-called slip characteristic map of the transmission the critical damage curves of several transmission ratios are included, whereby it may be interpolated on or between such predetermined critical damage curves to obtain the current critical slip value, i.e. that is valid for the prevailing operational conditions of the transmission. The existence of this slip characteristic map proves that the transmission may be safely subjected to a torque jolt, as well as to the belt slip that is caused thereby, up to the extent measured in the above experiment. By the application of the clutch control in accordance with the present invention the transmission efficiency is optimised while the belt slip increase in response to the torque jolt is limited sufficiently for not exceeding the critical slip value, as will be explained in more detail in the following, with reference to the figures, wherein:

Figure 1:
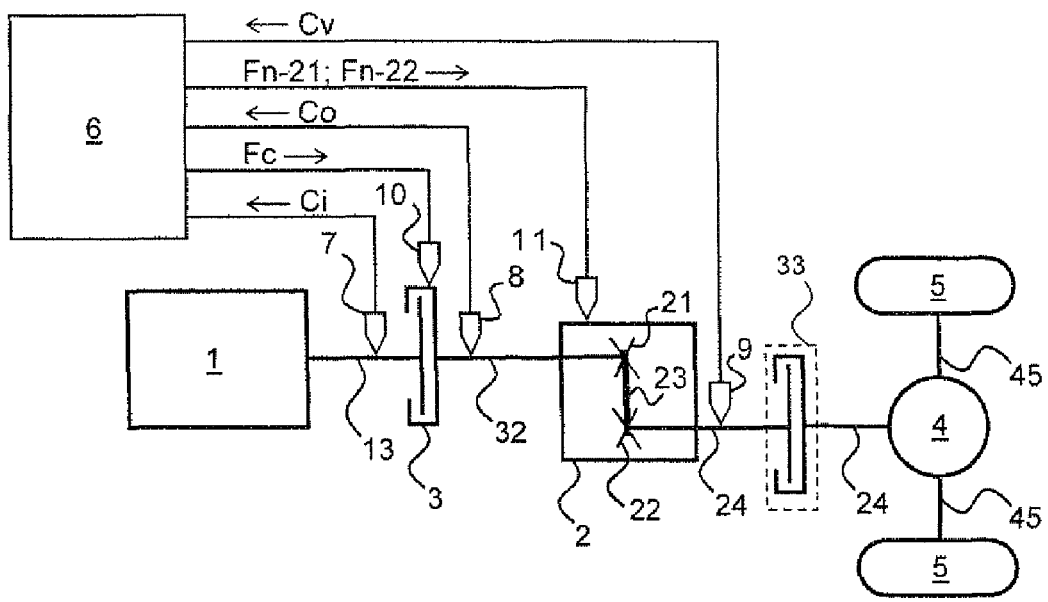
FIG. 1 is a schematic representation of a vehicular drive line provided with an engine, a friction clutch, a continuously variable transmission, a final drive mechanism and driven wheels, as well as a control means.

FIG. 1 depicts a vehicular drive line, which subsequently, i.e. downstream in the direction of the driving force, comprises an engine 1, a friction clutch 3, a belt-type continuously variable transmission 2, a final drive 4 mechanism including a differential gearing and two driven wheels 5. Drive shafts 13, 32, 24 and 45 are provided between and drivingly connect each of the above drive line components 1-5. The transmission 2 comprises two, schematically indicated pulleys 21 and 22 and a drive belt 23 wrapped around and in frictional contact with the pulleys 21, 22. Each pulley 21, 22 comprises two conical pulley discs that during operation are pushed towards each other, such that a normal force Fn is effected between the discs of each pulley 21 and 22 and the belt 23.

Further, control means are schematically indicated in FIG. 1, which means comprise an electronic control unit or "ECU" 6, three rotational speed sensors 7, 8 and 9 for measuring a clutch input side (i.e. shaft 13) rotational speed Ci, a clutch output side (i.e. shaft 32) rotational speed Co and a transmission output side (i.e. shaft 24) rotational speed Cv and two actuators 9 and 10 for a controlled activation of the clutch 3 and the transmission 2 respectively, e.g. by adjusting a clutch engagement force Fc as well as the pulley normal forces Fn-21 and Fn-22 in response to one or more operating parameters of the drive line.

Hereby, it is known to arrange and operate the ECU 6 such that a torque that is transmitted or transmissible by the clutch 3 is maintained at a lower level than the torque that is transmissible by the transmission 2, i.e. the transmission slip torque. In this arrangement, when a torque jolt is introduced in the drive line via a driven wheel 5, the clutch 3 will not merely transmit such increased torque level, but rather will to a large extend dampen the torque jolt by dissipating the mechanical energy associated therewith by an increase (or decrease) of the clutch slip Cs, defined as the quotient Ci/Co between the clutch input side speed Ci and the clutch output side speed Co. Accordingly, the drive line and in particular the transmission 2 is protected against a severe slipping of its belt and pulley components 23, 21 and 22. However, since the clutch 3 is arranged upstream from the transmission 2, the latter will experience an additional torque anyway. This additional torque occurs in response to the torque jolt, because the belt 23, the transmission input pulley 21, the shaft 32 connecting the clutch 3 to the transmission 2 and any output side components of the clutch (clutch plates, clutch fluid etc.) have to be accelerated (or decelerated) to be able to influence (i.e. increase or decrease) the clutch slip Cs. This additional torque will, however, not result in critical damage, provided the belt slip Bs caused thereby is limited to the extent that a critical slip value CBs is not exceeded thereby.

According to the invention such limitation of the belt slip Bs is realised by providing a further clutch 33 in the drive line that is arranged downstream from the transmission 2 and that is likewise arranged and controlled such that a torque that is transmitted or transmissible thereby is maintained at a lower level than the transmission slip torque. Alternatively, such limitation can according to the invention also be realised by controlling the transmission 2 and clutch 3 in accordance with the control method according to the present invention that is described in the following.

Figure 2:
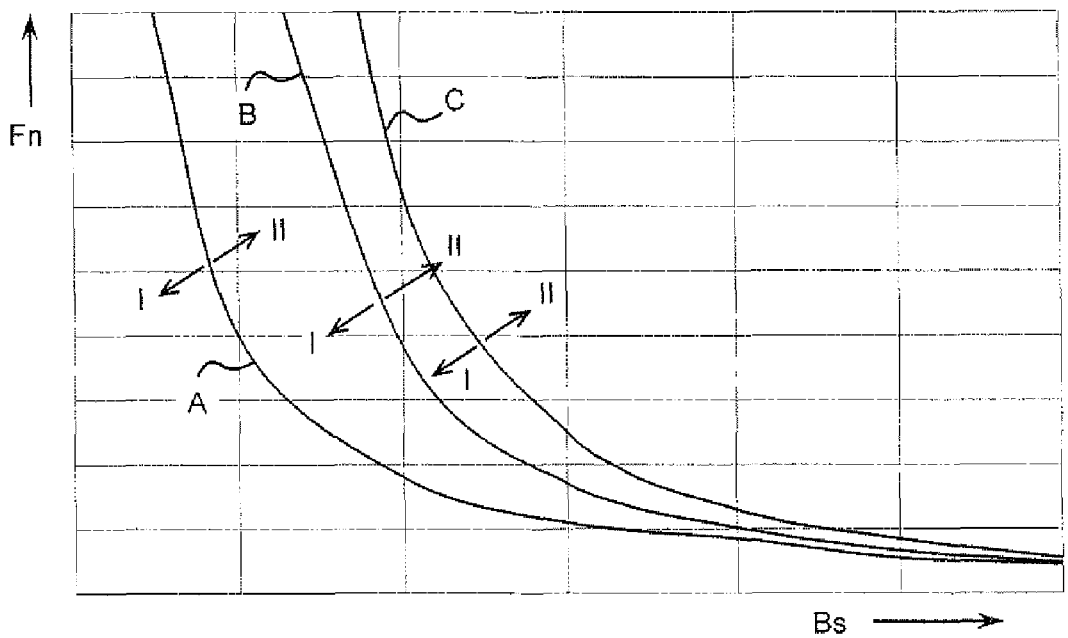
FIG. 2 is a graph illustrating the transmission's capacity to accommodate a speed difference between its belt and pulley components in relation to the level of the normal force applied there between and the geometric transmission ratio.

First of all, a typical property of the belt-type transmission will be explained with reference to the FIG. 2. It is known that this type of transmission 2 is at least to some extent able to withstand slippage, i.e. relative movement, between either pulley 21, 22 and the belt 23, which slippage is denoted the belt slip Bs hereinafter. FIG. 2 illustrates this feature for a specific type of belt 23 based on experimental data. In this figure it is defined as a function of the said normal force Fn and the degree of belt slip Bs, whether or not under the defined conditions the transmission 2 would be critically damaged, i.e. damaged to the extent that its normal or nominal operation is adversely affected. Hereby the so-called critical damage curves A, B and C in FIG. 2 indicate the maximum permissible or critical value CBs for the belt slip Bs, beneath which, indicated by arrows I, no such critical damage occurs and above which, indicated by arrows II, such damage does indeed occur. Accordingly, the transmission 2 is at least to some extent able to withstand belt slip Bs.

FIG. 2 also shows that the critical belt slip CBs is much smaller in the most decelerating or Low-ratio of the transmission, which is represented by curve A, than in its most accelerating or Overdrive-ratio represented by curve C, i.e. for the same degree of belt slip Bs damage occurs to the drive belt 23 or a pulley 21, 22 already at a lower level of the normal force Fn in the Low-ratio compared, for example, the Overdrive-ratio. Further, the critical damage curve B that also represents the Low-ratio was measured at an elevated rotational speed of the belt in comparison with the curve A, which show that the critical belt slip CBs increases as the belt rotational speed increases. Finally, it can be seen that the critical belt slip CBs generally decreases significantly with an increasing level of the normal force Fn. Thus, as a result of the above experiments, it was found that when a torque jolt travels through the transmission 2, it should be safely transmitted thereby provided that the actual belt slip Bs caused by the increased torque level does not exceed the relevant, i.e. current critical belt slip value CBs.

Figure 3:
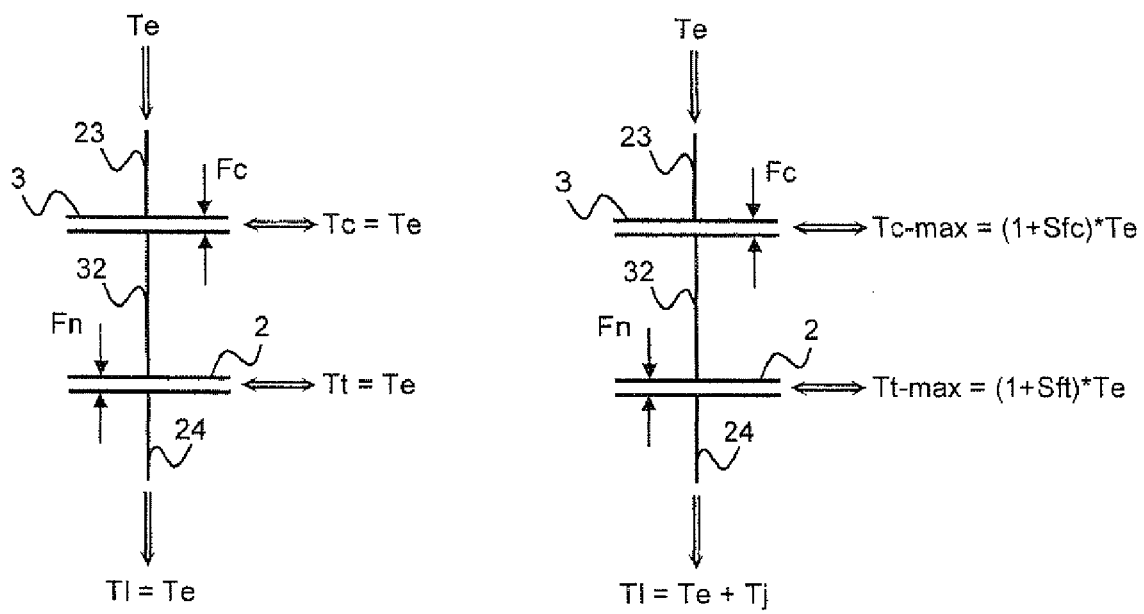
FIG. 3 is a diagrammatic functional representation of the drive line of FIG. 1 illustrating the effect of the occurrence of a torque jolt.

FIG. 3 illustrates the physics of a—in this example—positive torque jolt Tj introduced into a highly simplified drive line via the load, i.c. the transmission output side shaft 24 that is rigidly connected to the driven wheels 5 thereof. For the sake of simplicity, the drive line of FIG. 3 does not include any gearing-ratios and/or auxiliary drives. Also, any mechanical losses are not taken into account.

On the left-hand side of FIG. 3, the normal, steady state operation of the drive line is illustrated, wherein the engine generates an engine torque Te that is transmitted via the friction clutch 3 and the friction transmission 2 to the transmission output side shaft 24. In such steady state, a sufficient engagement force Fc resp. Fn is applied to the clutch 3 and the transmission 2 respectively, such that all of the engine torque Te, the torque Tc transmitted by the clutch 3, the torque Tt transmitted by the transmission 2 and the torque Tl taken up by the load 24 are the same.

Now, in the right-hand side of FIG. 3 the said torque jolt Tj is introduced into the drive line and works on the transmission output side 24. If by such torque jolt Tj a maximum torque transmissible by the transmission Tt-max, which can be defined in terms of the engine torque Te and a transmission safety margin, i.c. expressed in terms of a safety factor Sft according to:

$$Tt\text{-max}=(1+Sft)*Te$$

is exceeded, i.e. if:

$$Tj+Te>Tt\text{-max}=>Tj>Sft*Te$$

than the transmission output side shaft 24 will accelerate faster than the transmission input side shaft, i.e. the clutch output side shaft 32. by this acceleration of the transmission output side shaft 24 relative to the clutch output side shaft 32 a slipping of the transmission friction components, the said belt slip Bs, will increase. Thus such belt slip increase ΔBs is determined by how closely the acceleration $\alpha_{32}$ of the clutch output side shaft 32 can follow the instantaneous acceleration $\alpha_{24}$ of the load 24 during the duration t of the torque jolt Tj, which factor is determined by the combined inertia Ip of the drive line components to be accelerated and the amount of torque Ti available for such acceleration according to:

$$\Delta Bs = \int_0^t \left[\alpha_{24}(t) - \frac{Ti}{Ip}\right] \cdot dt$$

wherein:

$$Ti=(Sft-Sfc)*Te \text{ with } Sfc<Sft$$

with Sfc being a clutch safety factor defined according to:

$$Tc\text{-max}=(1+Sfc)*Te$$

wherein Tc-max is the maximum torque transmissible by the clutch 3.

Hereby, it is remarked that in the simplified drive line of FIG. 3 the combined inertia Ip is in fact determined only by the clutch output side shaft 32. However, in a practical drive line design the combined inertia Ip is not only determined by the clutch output side shaft 32, but also by the transmission input pulley 21 and all output side components of the clutch (clutch plates, clutch fluid etc.), i.e. at least when the slipping of the belt 23 occurs relative to the transmission input pulley 21. In situations where the slipping of the belt 23 occurs relative to the transmission output pulley 22, the said combined inertia Ip further includes the inertia of the belt 23, as well as a factor representing and corresponding to the transmission ratio defined as the quotient Co/Cv between the clutch output side speed Co (i.e. the transmission input side speed) and the transmission output side speed Cv. Hereby, it is remarked that it is usually appropriate to assume that the said slipping of the belt 23 occurs relative to the transmission output pulley 22.

Thus, with the above system and control method the belt slip increase ΔBs in response to the torque jolt Tj is favourably reduced, which in turn results either in the belt slip Bs not exceeding the critical belt slip value CBs at all, or at least in the belt slip Bs taking more time to reach such critical belt slip value CBs. This additional time may be favourably used to invoke countermeasures in response to the occurrence of the torque jolt Tj for preventing or limiting the increase of the belt slip Bs, such as:

increasing the transmission safety factor Sft by actively reducing the engine torque Te, or by increasing the level of the normal force Fn, or by applying both such measures simultaneously, or actively changing the transmission ratio Co/Cv to reduce the said torque jolt Tj at the transmission output pulley 22.

Hereby, the occurrence of the torque jolt Tj may itself be correlated to and/or detected by the said acceleration $\alpha_{24}$ of the load 24.

According to the invention it may be concluded from the above analysis that the efficiency of the transmission may be improved by reducing the normal force Fn that is applied in response to an engine torque level Te in a reliable manner, i.e. whilst avoiding the said critical damage due to a severe slipping of the belt 23 relative to a transmission pulley 21, 22 from occurring, by means of one or more of the following measures:

designing the drive line such that the said combined inertia Ip is comparatively small;

applying a small clutch safety factor Sfc, preferably a factor of zero;

adapting the said transmission safety factor Sft during operation based on the said slip characteristic map, preferably by increasing and/or decreasing it at least in relation to, but preferably in proportion with one or more of:
the transmission ratio Co/Cv,
the inverse value of the belt rotational speed, or
the inverse value of the current critical belt slip value CBs, e.g. as provided by the slip characteristic map of the transmission;

calculating the said normal force Fn that is required for the maximum transmissible torque of the transmission Tt-max to be equal to the engine torque Te increased by a safety margin that is large enough to ensure that the increase in belt slip ΔBs in response to the largest occurring torque jolt Tj does not exceed the smallest occurring critical belt slip value CBs.

Further on this latter measure of determining a suitable, i.e. sufficient transmission safety margin based on the slip characteristic map of the transmission, it is remarked that a fixed, i.e. safety margin of between 2 to 7 kN, preferably around 4 kN added to the normal force Fn-min that is minimally required to transmit the engine torque Te (i.e. Fn-min@Tt-max=Te) was found to be generally applicable, which means that the above defined transmission safety factor Sft actually increases as the engine torque Te decreases, i.e. is inversely proportional therewith. Favourably, this latter feature takes into account that the engine torque Te and the normal force Fn determined by the ECU 6 are usually subject to an absolute error. Thus at a relatively low engine torque Te the normal force Fn applied in response thereto is subject to a relatively large uncertainty, which requires a relatively large transmission safety factor Sft. When such uncertainty is comparatively small, a more or less constant transmission safety factor Sft can suffice.

An additional advantage of such control strategies including a transmission safety factor Sft, which either is constant or increases in relation to the engine torque Te, is that the said amount of torque Ti that is available for acceleration of the clutch output side shaft 32, which torque Ti is proportional to the transmission safety factor Sft minus 1 times the engine torque Te, can be maintained at an acceptable level even at the said relatively low engine torque Te.

Thus, according to the invention, when applying one or more of the above measures, the transmission 2 is favourably and effectively protected against critical damage caused by torque jolts Tj travelling upstream through the drive line even though the clutch 3 is placed upstream from the transmission 2.

Finally, it is remarked that the above analysis, although focussing on the positive torque jolt Tj that is introduced into the drive line via the load 5 with the clutch 3 being arranged upstream from the transmission 2, in principle (mutatis mutandis) is also valid for a negative torque jolt or for any torque jolt originating from the engine in case the clutch 3 is arranged downstream from the transmission 2 in the drive line.

The invention claimed is:

1. Method for controlling a friction clutch (3) and a continuously variable transmission (2) provided with a drive belt (23) wrapped around and in frictional contact with two variable pulleys (21, 22) in a vehicular drive line, which method includes the step of activating the clutch (3) and the transmission (2) in relation to an engine torque (Te) generated by an engine (1) of the drive line, at least effecting that a torque level (Tc-max) transmissible by the clutch (3) is smaller than a torque level (Tt-max) transmissible by the transmission (2) and that a safety margin is realised between the torque level (Tt-max) transmissible by the transmission (2) and the engine torque (Te), wherein, said safety margin is adapted during operation by increasing or decreasing said safety margin at least in relation to and in proportion with one or more of:
the value of a transmission ratio (Co/Cv) of the transmission (2);
the inverse value of a rotational speed of the belt (23); and
the inverse value of a current critical belt slip value (CBs) at which damage would occur to the transmission (2) to the extent that the transmission's operation is adversely affected thereby, and
a normal force (Fn) is applied in the frictional contact between the belt (23) and the pulleys (21, 22), which normal force (Fn) is determined by adding a margin to a nominal normal force (Fn-min) that would be required for the transmissible torque (Tt-max) of the transmission (2) to be equal to the engine torque (Te), which margin is maintained with the range of 1 to 7 kN during operation of the transmission (2).

2. The method of claim 1, wherein the normal force (Fn) is applied in the frictional contact between the belt (23) and the pulleys (21, 22), which normal force (Fn) is determined by adding said margin to the nominal normal force (Fn-min) that would be required for the transmissible torque (Tt-max) of the transmission (2) to be equal to the engine torque (Te), said margin is maintained with the range of 1 to about 4 kN during operation of the transmission (2).

3. Method for controlling a friction clutch (3) and a continuously variable transmission (2) provided with a drive belt (23) wrapped around and in frictional contact with two variable pulleys (21, 22) in a vehicular drive line, which method includes the step of activating the clutch (3) and the transmission (2) in relation to an engine torque (Te) generated by an engine (1) of the drive line, at least effecting that a torque level (Tc-max) transmissible by the clutch (3) is smaller than a torque level (Tt-max) transmissible by the transmission (2) and that a safety margin is realised between the torque level (Tt-max) transmissible by the transmission (2) and the engine torque (Te), wherein, said safety margin is adapted during operation by increasing or decreasing said safety margin at least in relation to and in proportion with
the inverse value of a current critical belt slip value (CBs) at which damage would occur to the transmission (2) to the extent that the transmission's operation is adversely affected thereby, and
in response to the occurrence of a torque jolt (Tj) introduced in the drive line during operation one or more of the following measures is invoked:
increasing the safety margin by either one of actively reducing the engine torque (Te) and increasing a normal force (Fn) that is applied in the frictional contact between the belt (23) and the pulleys (21, 22), or both;
actively changing the transmission ratio (Co/Cv) of the transmission (2) to counteract the torque jolt (Tj) experienced at an transmission output pulley (22) of the pulleys (21, 22).

* * * * *